United States Patent [19]

Boehmke et al.

[11] B 3,995,997
[45] Dec. 7, 1976

[54] CONCENTRATED SOLUTIONS OF ANIONIC DYESTUFFS

[75] Inventors: Guenther Boehmke, Leverkusen; Werner Theuer, Opladen-Luetzenkirchen; Konrad Nonn, Leverkusen; Georg Pape, Opladen, all of Germany

[73] Assignee: Bayer Aktiengesellschaft, Leverkusen, Germany

[22] Filed: Aug. 8, 1974

[21] Appl. No.: 495,903

[44] Published under the second Trial Voluntary Protest Program on February 17, 1976 as document No. B 495,903.

[30] Foreign Application Priority Data

Aug. 16, 1973 Germany .................. 2341293

[52] U.S. Cl. .......................................... 8/84; 8/54; 8/54.2; 8/172 R
[51] Int. Cl.² .................................. D06P 3/14
[58] Field of Search ............. 8/84, 54, 54.2, 172

[56] References Cited

UNITED STATES PATENTS

| | | | |
|---|---|---|---|
| 2,986,444 | 5/1961 | Rokohl et al. | 8/84 |
| 3,307,901 | 3/1967 | Bindler et al. | 8/84 |
| 3,446,569 | 5/1969 | Braun et al. | 8/84 |
| 3,529,922 | 9/1970 | Berger et al. | 8/84 |

Primary Examiner—V.P. Hoke
Attorney, Agent, or Firm—Plumley and Tyner

[57] ABSTRACT

Anionic dyestuffs which contain as the cation at least one cation of the formula

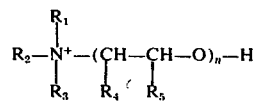

wherein $R_1$, $R_2$ and $R_3$ denote alkyl with 1–6 C-atoms, cycloalkyl with 5–7 C-atoms or aralkyl with 7–12 C-atoms or represent a group

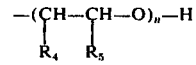

wherein
$R_4$ and $R_5$ denote hydrogen, methyl or ethyl and
$n$ represents the numbers 1–20
are suitable for the preparation of storage-stable, water-miscible, concentrated solutions.

2 Claims, No Drawings

CONCENTRATED SOLUTIONS OF ANIONIC DYESTUFFS

The present invention relates to anionic dyestuffs which contain, as the cation, at least one cation of the formula

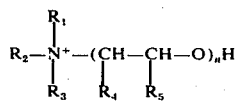

wherein $R_1$, $R_2$ and $R_3$ denote alkyl with 1–6 C atoms, cycloalkyl with 5–7 C atoms or aralkyl with 7–12 C atoms or represent a group

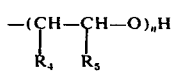

wherein $R_4$ and $R_5$ denote hydrogen, methyl or ethyl and $n$ represents the numbers 1–20.

The application further relates to storage-stable, water-miscible concentrated solutions of the dyestuffs which accord with the claim and organic, water-miscible solvents and/or water, optionally with the addition of customary solubilising agents.

A particular preference of these concentrated solutions of anionic dyestuffs is their good solubility in water. The concentration of the dyestuffs should be 5–50%, preferably 10–40%. Suitable anionic dyestuffs are dyestuffs, containing carboxyl groups or sulphonic acid groups, from the series of the azo, anthraquinone or phthalocyanine dyestuffs, and anionic optical brighteners, especially from the series of the stilbenedisulphonic acid derivatives; numerous such dyestuffs have been described in the literature.

The preferred solvents used are amines of the formula

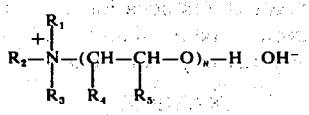

wherein $R_1$, $R_2$, $R_3$, $R_4$, $R_5$ and $n$ have the abovementioned meaning, by themselves or mixed with other organic water-miscible solvents.

The invention further relates to processes for the preparation of the dyestuffs according to the invention and of the concentrated solutions, and to the use of the dyestuffs according to the invention and of the concentrated solutions according to the invention for dyeing natural or synthetic fibre materials containing nitrogen and natural or synthetic fibre materials containing hydroxyl groups.

The cations can be introduced into these dyestuff solutions either by dissolving the dyestuff-acids with the aid of the quaternary bases, optionally in the presence of solvents, or by reacting dyestuff salts with the salts of the quaternary bases, in which case dye salts remain in solution and other salts, for example sodium chloride, precipitate and are filtered off.

The quaternary bases are preferably prepared by reaction of the alkylamines, alkyl-hydroxyalkylamines or hydroxyalkylamines with alkylene oxides in the presence of water. For example, 1 mol of triethanolamine is reacted with 1 mol of ethylene oxide in the presence of 1 mol of water at 30°–90°C (amine 1), or 3 mols of ethylene oxide are added on, ether bridges being formed (amine 2).

Butylamine can be reacted with 3 mols of ethylene oxide in the presence of 1 mol of water, the temperature being raised in the course of the reaction from 35°C to 80°C (amine 3), or can in the same way be converted to the polyether by using 5 mols of ethylene oxide (amine 4).

The reaction can be expressed by the following equation:

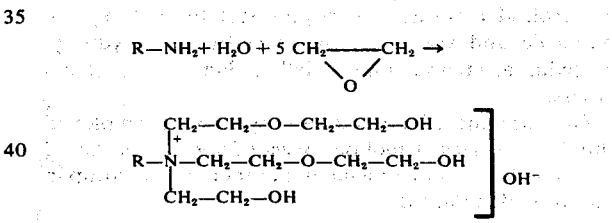

The table which follows lists a series of quaternary bases to be used according to the invention:

| Amine No. | $R_1$ | $R_2$ | $R_3$ | R' |
|---|---|---|---|---|
| 1 | R' | R' | R' | —CH$_2$—CH$_2$OH |
| 2 | —CH$_2$—CH$_2$—OH | —CH$_2$—CH$_2$—OH | R' | —CH$_2$—CH$_2$—O—CH$_2$—CH$_2$—OH |
| 3 | C$_4$H$_9$ | R' | R' | —CH$_2$—CH$_2$—OH |
| 4 | C$_4$H$_9$ | C$_2$H$_4$OH | R' | —CH$_2$—CH$_2$—O—CH$_2$—CH$_2$—OH |
| 5 | —CH$_2$—CH(OH)—CH$_3$ | R' | R' | —CH$_2$—CH$_2$—OH |
| 6 | —CH$_2$—CH(OH)—CH$_3$ | —CH$_2$—CH(OH)—CH$_3$ | R' | —CH$_2$—CH$_2$—OH |
| 7 | —CH$_2$—CH(OH)—C$_2$H$_5$ | R' | R' | —CH$_2$—CH$_2$—OH |
| 8 | —CH$_2$—CH(OH)—C$_2$H$_5$ | R' | R' | —CH$_2$—CH$_2$—O—CH$_2$—CH$_2$—OH |
| 9 | —CH$_3$ | —CH$_3$ | —CH$_3$ | —(CH$_2$—CH$_2$—O)$_3$—H |

-continued

| Amine No. | R₁ | R₂ | R₃ | R' |
|---|---|---|---|---|
| 10 | —CH₃ | —CH₃ | —R' | —CH₂—CH₂—O—CH₂—CH₂—OH |
| 11 | —CH₃ | R' | R' | —CH₂—CH₂—O—CH₂—CH₂—OH |
| 12 | —CH₃ | R' | R' | —CH₂—CH₂—OH |
| 13 | —C₂H₅ | R' | R' | —CH₂—CH₂—OH |
| 14 | —C₃H₇ | —CH₂—CH₂—OH | R' | —CH₂—CH₂—O—CH₂—CH₂—OH |
| 15 | C₆H₅—CH₂— | R' | R' | —CH₂—CH₂—OH |
| 16 | —CH(CH₃)—CH(CH₃)—OH | R' | R' | —CH₂—CH₂—OH |
| 17 | —CH(CH₃)—CH(CH₃)—OH | —CH(CH₃)—CH(CH₃)—OH | R' | —CH₂—CH₂—OH |
| 18 | cyclohexyl | R' | R' | —CH₂—CH₂—OH |
| 19 | cyclohexyl | CH₃ | —CH₃ | —CH₂—CH(OH)—CH₃ |

The salts of the amines listed can also be prepared by alkylation with alkyl chlorides or alkyl-sulphonates. Thus, for example, the chlorides of the amines 12 and 13 can be prepared from triethanolamine and methyl chloride or ethyl chloride.

The following can be used as suitable organic solvents, which are preferably also water-soluble: formamide, dimethylformamide, ethanol, isopropanol, butanol, ethylene glycol, propylene glycol, butylene glycol, glycerol, glycerol acetate, glycol acetate, hydroxypropionitrile and also urea, hydroxyethylurea, hydroxypropylurea, ethanolamine, diethanolamine and glycol ethers.

The amount of the quaternary amines employed should be at least 1 mol per dyestuff and can be raised to as much as 1 mol equivalent per mol of acid group in the dyestuff molecule.

EXAMPLE 1

25 g of the optical brightener

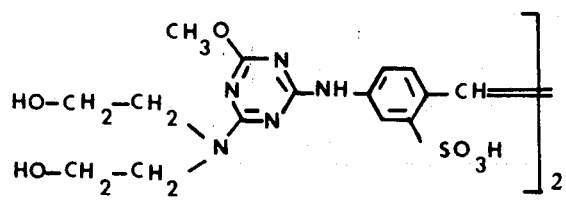

in the acid form are dissolved in 22 g of amine 2 and 53 g of water. A solution of excellent storage stability is obtained. The brightener solution can be diluted with water in any desired proportion. Solutions of comparable stability can be obtained if instead of the amine 2 the amines 11, 13 or 18 are employed.

EXAMPLE 2

20 g of the optical brightener

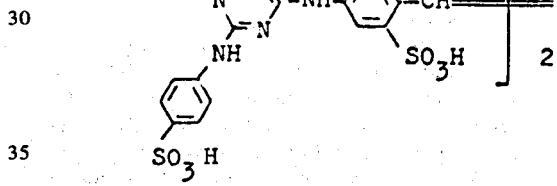

in the acid form are dissolved in 28 g of amine 8, 12 g of ethylene glycol and 40 g of water. This stable brightener solution is very readily soluble in water and lends itself well to metering by means of a mechanical device.

0.5 g of the brightener solution is introduced into 1 l of water in a dyebath, and distributed by brief stirring. 50 g of a rayon yarn are introduced into the bath, which is heated to 30°–40°C with occasional stirring. After 30 minutes, the rayon is taken out and rinsed in water. An evenly brightened rayon yarn is obtained.

EXAMPLE 3

20 g of the dyestuff-acid

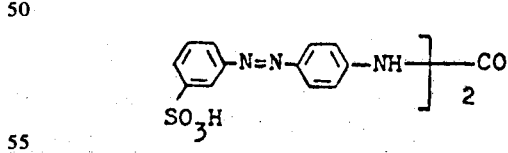

are dissolved in 25 g of amine 10, 10 g of isopropanol and 45 g of water. Slight warming to 40°–45°C increases the speed of solution. The concentrated solution of the yellow dyestuff can be kept for a long period and even on dilution with water in any desired concentration gives stable solutions from which the dyestuff does not crystallise out. Instead of the amine 10, the amines 11, 12 or 13 can be employed, with the same result.

EXAMPLE 4

22 g of the dye-acid of the yellow dyestuff

[Structure: phenyl-N=N-phenyl(SO₃H)-NH-CO- ]₂ with OCH₃ substituent are dissolved in 25 g of amine 2, 18 g of ethylene glycol ether and 35 g of water. The resulting dyestuff solution is stable even when cold and lends itself well to metering by automatic devices.

EXAMPLE 5

18 g of the red dyestuff

[Structure: HSO₃-phenyl-N=N-phenyl-N=N-naphthalene with OH, SO₃H, NH-CO-phenyl substituents]

in the acid form are dissolved in 20 g of amine 1, 22 g of glycol and 40 g of water. A stable solution of the red dyestuff is obtained; the solution can equally be obtained with amines 2, 14, 15 and 18.

EXAMPLE 6

12 g of the acid-precipitated dyestuff

Cu-Complex

[Structure showing symmetric bis-azo copper complex with NH₂, OH, HSO₃, SO₃H groups]

are dissolved in 18 g of amine 2, 6 g of butanol and 64 g of water. The solution of the blue dyestuff can be stored for a prolonged period without crystallisation.

EXAMPLE 7

20 g of the dye-acid of the orange dyestuff

[Structure: phenyl-N=N-tetrahydronaphthalene(OH)(HSO₃)-NH-CO-NH-naphthalene(OH)(SO₃H)-N=N-phenyl-COOH]

25 g of amine 14 and 55 g of water were stirred together until a solution had formed. The resulting solution is stable on storage, in contrast to a solution prepared with triethanolamine.

EXAMPLE 8

16 g of the acid-precipitated dyestuff

[Structure: HSO₃-naphthalene-N=N-naphthalene(OH)(HSO₃)-NH-CO-NH-naphthalene(OH)(SO₃H)-N=N-phenyl(OCH₃)]

are dissolved in 25 g of amine 8, 9 g of glycol and 50 g of water. The storage-stable solution of the scarlet-red dyestuff can be diluted with water in any desired proportions.

EXAMPLE 9

22 g of the dyestuff

[Structure: biphenyl(OH)-N=N-phenyl-O-CH₂-CH₂-SO₃H]

which has been precipitated with acid are dissolved in 20 parts of amine 2, 20 parts of propylene glycol and 38 parts of water. The desired amount of the yellow dyestuff can be added direct to the dyebath by using this solution. Dyeings of polyamide produced with this dyestuff preparation turn out to be particularly even.

EXAMPLE 10

30 g of the dyestuff-acid

[Structure: phenyl-N(CH₃)-O₂S-phenyl(CH₃)-N=N-C=C(OH)-C(CH₃)₂=N-N(-phenyl-SO₃H)]

are dissolved in 30 g of amine 2, 20 g of ethylene glycol and 20 g of isopropanol. This deeply coloured solution is a stable preparation of the yellow dyestuff used for polyamide fabrics.

Further concentrated solutions are prepared analogously to the above examples, from the components stated:

NO. 11

20 g of the yellow dyestuff

[Structure: pyrazolone derivative with CH₃, N=N linkage to phenyl-SO₂-O-phenyl, SO₃H-phenyl, and C(CH₃)₂ group, ]₂

22 g of amine 4, 18 g of butanol, 25 g of butyl glycol and 15 g of water.

To dye a polyamide-6 fabric, 1 g of a levelling agent is introduced into a 1 l dyebath, the bath is warmed to 40°C and 50 g of the fabric are introduced into the bath and pretreated for 15 minutes. The pH value of the dyebath is adjusted to pH 6 with acetic acid.

1.5 g of the dyestuff solution mentioned above are then added. Distribution of the material takes place very rapidly and can be achieved without pre-solution, such as is necessary for a dyestuff in powder form. The bath is heated to 98°C over the course of 30–45 minutes and kept at this temperature for 1 hour. The fabric is then rinsed. A clear and non-stripy yellow dyeing of the polyamide fabric is obtained.

NO. 12

20 g of the yellow dyestuff

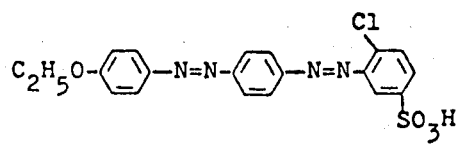

25 g of amine 2, 15 g of water, 20 g of glycol and 20 g of butanol.

NO. 13

25 g of the yellow dyestuff

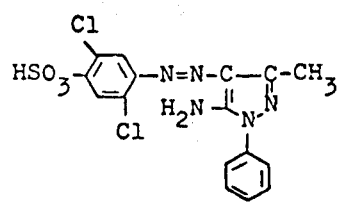

23 g of amine 8, 22 g of ethyl glycol, 15 g of butanol and 15 g of water.

NO. 14

25 g of the yellow dyestuff

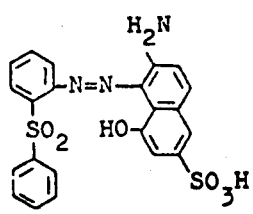

30 g of amine 13, 25 g of glycol and 20 g of ethanol.

NO. 15

21 g of the red dyestuff

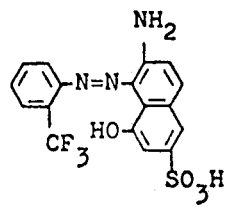

24 g of amine 7, 35 g of formamide, 15 g of triethylene glycol and 10 g of water.

NO. 16

25 g of the blue dyestuff

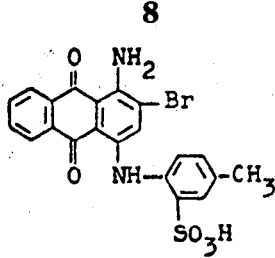

32 g of amine 2, 33 g of dimethylformamide and 20 g of benzyl alcohol.

NO. 17

25 g of the blue dyestuff

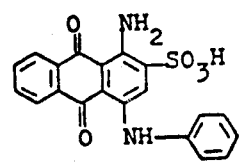

23 g of amine 2, 21 g of ethyl glycol ether, 21 g of formamide and 10 g of isopropanol.

NO. 18

15 g of the blue dyestuff

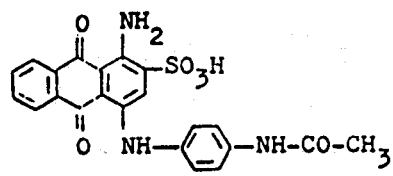

15 g of amine 2, 50 g of formamide and 20 g of glycol.

NO. 19

21 g of the orange dyestuff

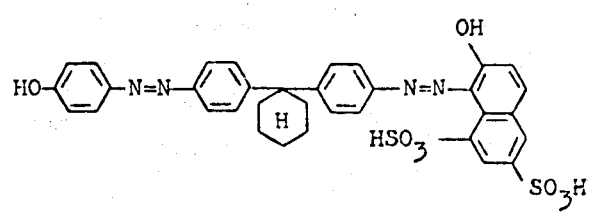

21 g of amine 5, 30 g of water and 28 g of methyl glycol ether.

NO. 20

30 g of the orange dyestuff

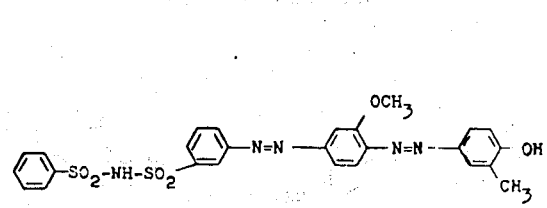

which has been isolated under acid conditions, 35 g of amine 10, 15 g of water, 5 g of isopropanol and 15 g of diglycol.

NO. 21

25 g of the blue dyestuff

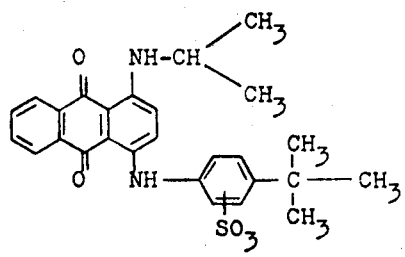

30 g of amine 12, 20 g of diglycol and 25 g of water.

NO. 22

25 g of the blue dyestuff

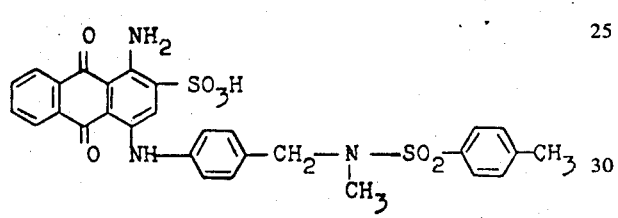

29 g of amine 15, 20 g of isopropanol and 26 g of dimethylformamide.

This dyestuff solution can be used, without further pre-solution or dilution, for charging a wool dyebath.

50 g of wool are introduced into a 1 1 dyebath which has been adjusted to a pH value of 4.5 with acid. The bath is heated and at approx. 50°C 3 g of the dyestuff solution obtained according to this example are added. The bath is then heated to 95°C. After 30 minutes, 10 g of sodium sulphate are added and the dyeing is completed in 45–60 minutes. The wool is then rinsed and postwashed with a non-ionic detergent.

An even and wash-fast blue dyeing of the wool is achieved.

1. Anionic dyestuffs which contain a carboxyl or sulfonic acid substituent and from 1 mole per dyestuff molecule to 1 mole equivalent per mole of the acid group in the dyestuff molecule of at least one cation of the formula

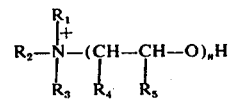

wherein
R$_1$, R$_2$, and R$_3$ denote alkyl with 1–6 carbon atoms, cycloalkyl with 5–7 carbon atoms, aralkyl with 7–12 carbon atoms, or the group:

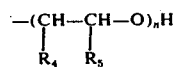

wherein
R$_4$ and R$_5$ denote hydrogen, methyl or ethyl and $n$ is a number from 1 to 20.

2. Storage-stable, water-miscible concentrated solutions of the anionic dyestuffs of claim 1 in an organic, water-miscible solvent, water, or a mixture of such solvent and water.

* * * * *